8273X
The specification in this patent is not in print.
E. L. Miller.
Car Propeller.
No. Patented Jun. 19, 1854.
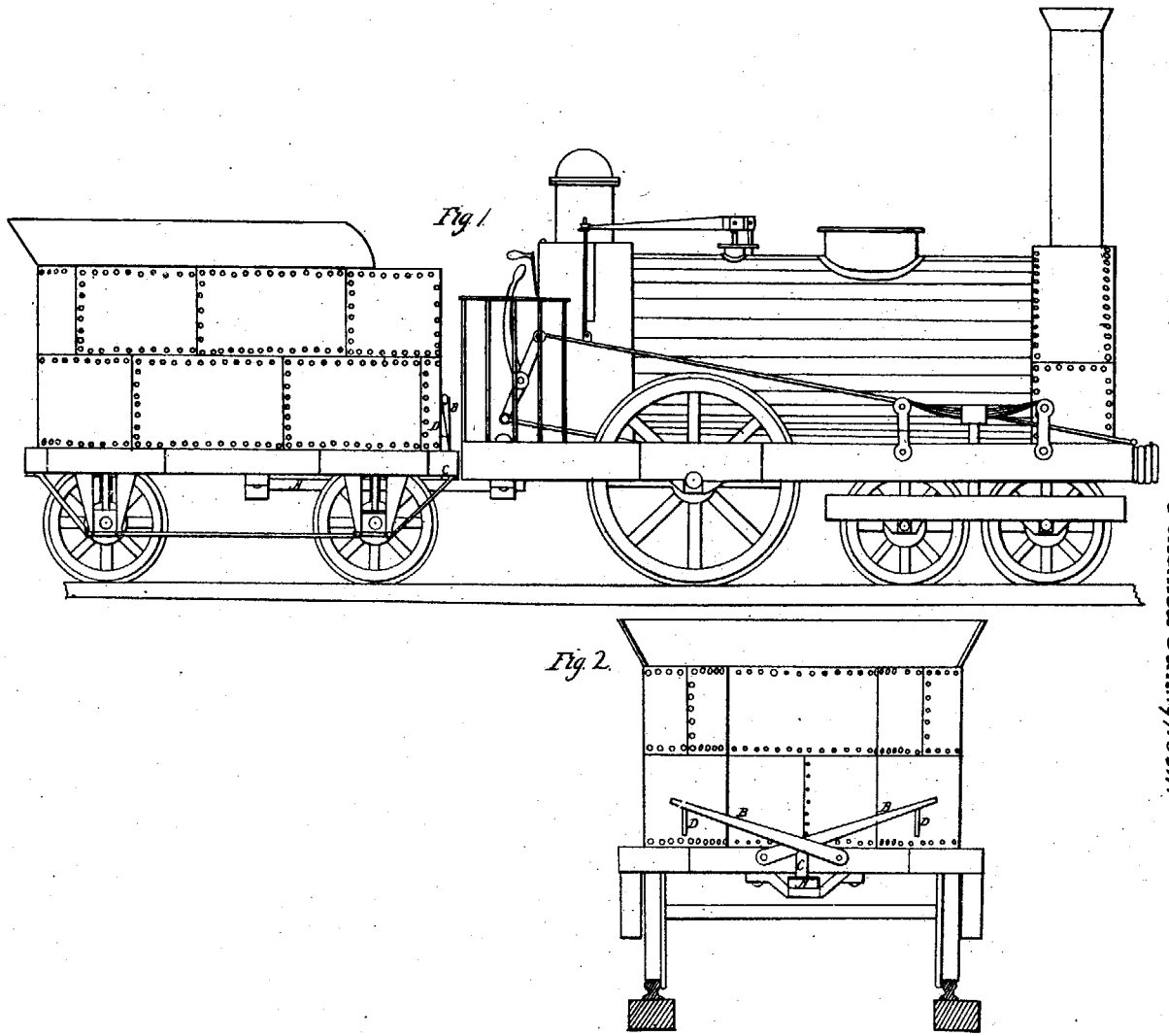
THE NORRIS PETERS CO., PHOTO-LITHO., WASHINGTON, D. C.

June 19. 1834 8273X 449.

Ezra. L. Miller of Charleston South Carolina

Letters Patent

The Schedule refered to in these Letters Patent and making part of the same contain-
ing a description in the words of the said Ezra L. Miller himself of his improvement
in the mode of increasing the adhesion of the driving wheels of the Locomotive
Steam Engine.

To all to whom these presents shall come.

Be it known that I Ezra L. Miller of the City and District of Charleston State
of South Carolina have invented a new and useful mode of increasing the adhesion of
the driving wheels of the Locomotive steam Engine on Rail Roads by using the tender
or car next the Engine for the purpose of adding weight to the driving Wheels of
the Engine at such times only as a greater adhesion is required than the weight
would give which it would be practicable to carry as a fixed weight on those
wheels without injury to the road. At the points of starting and on the
ascents where increased adhesion is required. I attach part of the weight of
the Car or tender which is next the engine to the end of the frame of the En-
gine next the driving wheels which may be done by means of a lever, screw, wedge
or pulley. and detach it again when the increased adhesion is no longer neces-
sary. The mode which I have used and found to answer perfectly in prac-
tice is simply to connect the car or tender next the Engine to the Engine by a strong iron
bar or lever one end of which is bolted to the under side of a cross timber
in the frame of the Car or tender, a little back of the centre and which lever
extends under the frame of the tender to the end of the frame of the Engine and into
the iron which together with the drawing bolt secures it to the Engine.
Transversely to this lever. I attach to the end of the tender next the Engine two
levers. so that their fulcrums shall be six or eight inches on each side of
the main lever, or drawing bar. These levers have a jaw or pivot five or
six inches in length directly over the main lever. and should be about 4 1/2
feet in length. When the increased adhesion is wanted. the Engineer
has only to place his foot upon the ends of those levers and press them in
to a hook or groove for that purpose on the corner post of the tender and a
portion of the weight of the Car or tender next the Engine is thus thrown
upon the driving wheels of the Engine. and when the increased adhesion 80. 8273X is no longer wanted, this weight is detached by simply loosing the ends of the levers. What I claim as my invention is the making use of the car or tender next the Engine for the purpose of increasing the adhesion of the driving wheels of the Locomotive Steam Engine at those points where more adhesion is required than the weight would give which it is eligible to carry as a fixed weight on those wheels whether the same be effected in the mode above described or any other which attains the same end.

Exd. Witnesses

W.H. Walter Clarke — Ezra L. Miller

Wm Bayliss.

Drawing (585 work)